United States Patent [19]

Garvey et al.

[11] Patent Number: 4,562,856

[45] Date of Patent: Jan. 7, 1986

[54] CONNECTOR ASSEMBLY FOR A GAS

[75] Inventors: Paul W. Garvey; John K. Kert, both of Mississauga, Canada

[73] Assignee: Union Carbide Canada Limited, East Toronto, Canada

[21] Appl. No.: 656,813

[22] Filed: Oct. 1, 1984

[51] Int. Cl.[4] .......... F16K 43/00

[52] U.S. Cl. .......... 137/329.3; 137/614.2; 137/322; 251/149.4; 251/149.5; 251/149.9; 251/900

[58] Field of Search .......... 137/329.1, 329.2, 329.3, 137/329.4, 614.19, 614.2, 315, 322; 251/DIG. 1, 149.4, 149.5, 149.6, 149.8, 149.9

[56] References Cited

U.S. PATENT DOCUMENTS

| | | | |
|---|---|---|---|
| 1,703,861 | 3/1929 | Bohnhardt | 137/329.3 |
| 2,278,580 | 4/1942 | Coles et al. | 137/329.4 |
| 3,563,267 | 2/1971 | Thompson | 137/329.1 |
| 4,190,075 | 2/1980 | Kayser | 137/329.1 |

*Primary Examiner*—George L. Walton

*Attorney, Agent, or Firm*—James C. Arvantes; William G. Hopley; Albert E. Koller

[57] ABSTRACT

A valve assembly has an outer body with an internal passageway for gas containing a valve seat and a valve member which can be lifted from the valve seat by rearward pressure. An inner body is threaded in the passageway, and itself includes an internal passage and a plunger within the passage. The plunger has a forward hollow sleeve portion and two arms extending rearwardly at diametrally opposite positions, the arms being linked at their rearward ends by a bridge from which extends an activating member adapted to hold the valve member away from the valve seat. The plunger has a sealing member forwardly of the activating member for closing the internal passage when the plunger is in a forward position. The inner body has two opposed grooves to receiving the arms, thus interlocking the plunger and the inner body so that rotation of the one requires rotation of the other. The bridge portion can be engaged by a forked tool for rotating it.

6 Claims, 7 Drawing Figures

CONNECTOR ASSEMBLY FOR A GAS

This invention relates generally to connector assemblies for gases, and has particular relevance to gas connector assemblies utilized in hospitals and the like for dispensing various medical gases such as medical air, oxygen, nitrous oxide and nitrogen to collecting bottles, anaesthesia machine tubing, inlets and outlets, ventilators, incubators, flowmeters and regulators, oxygen generators and Walker units, wherever and whenever gas application is practiced.

While it will be evident from what follows that the present invention is not limited to medical applications, there are particular problems associated with the current method of gas dispensing in hospitals which this invention resolves. It is therefore appropriate to discuss the drawbacks of the conventional practice in this regard so that the advantages of this invention will be more clearly perceived.

BACKGROUND OF THE INVENTION

The current construction of the medical gas connector assemblies utilized in hospitals and the like for dispensing medical gases such as nitrous oxide, nitrogen, oxygen, etc., is such that there is a serious risk of interchanging the gas-specific portions of each connector assembly after disassembly for purposes of repair of cleaning. The gas-specific portions of the connector assemblies, for gases such as nitrogen, nitrous oxide and air, define diameter-indexed, two stage bores having a first diameter adjacent the entrance end and a smaller diameter further inward from the entrance end. The connector elements at the ends of hoses or gas using devices intended to receive the different gases are also diameter-indexed, i.e. in two steps, with a smaller diameter at the tip and a larger diameter further inwardly from the tip. In each case, the diameters of the hose connectors are complementary to the appropriate diameters of the assemblies into which they are inserted. Once inserted, the appropriate size of nut is threaded onto threads externally of the assembly, to hold the connector in place. Thus the nuts are also gas-specific. The insertion of the connector depresses a plunger located internally of the assembly, and this in turn opens a check-valve to admit gas into the connector.

A standard code has been adopted throughout North America in regard to hand-tightened assemblies for dispensing medical gases, and is known generally as the D.I.S.S. system (Diameter-Index Safey System). Simply stated, the non-interchangeable indexing is achieved by a series of increasing and decreasing diameters. Thus, the gas for which the outermost diameter is largest will also have the smallest innermost diameter. The next gas would have a slightly smaller outer diameter and a slightly larger inner diameter, and so forth. This prevents full insertion of any but the connector for the correct gas using device.

As previously stated, however, the part which defines the two-stages bore of D.I.S.S. system (as constructed by a number of manufacturers) can itself be removed by unscrewing from a rearward portion of the complete assembly, normally called the rear coupler. All of these portions, called front couplers, have identical threaded bosses with the same thread size and diameter (9/16″-18), and any one of them can be threaded into all of the rear couplers. Thus it occasionally happens that the serviceman, after disassembly for cleaning or repair, inadvertently interchanges the front couplers. In a medical situation, of course, this is highly dangerous, and could result in the administration of the wrong gas to a patient.

Described and claimed in U.S. Patent Application Ser. No. 479,532 filed on Mar. 28, 1983, now U.S. Pat. No. 4,527,587 is a valve assembly for dispensing a gas into a suitable connector, the valve assembly consisting essentially of an outer body and an inner body. The outer body has an internal passageway for the gas which opens through a front end of the outer body, and the inner body is threaded into the passageway from the front. The inner body has an internal opening which, with the passageway, defines a continuous passage. An axially movable plunger is located in the opening of the inner body, and located in the passage is a valve means which is normally closed but can be opened by rearward movement of the plunger. The plunger and the inner body have complementary, close-fitting, non-round portions, such as a hexagonal interfit, by which rotation of the plunger requires rotation of the inner body. The plunger has a means by which a suitable tool can rotate the plunger and thus also the inner body.

While the assembly described in the above-mentioned patent application functions quite well, and certainly solves a number of problems with the prior art, there is room for still further improvement in terms of safety, simplicity, lower cost, and facilitating a higher rate of gas flow.

In terms of safety, it is seen as advantageous to preclude loss of specificity through routine maintenance of the valve or valves installed into a D.I.S.S. coupler. In the structure to be described herein, the coupler is to be left affixed to its primary attachment, and the internal indexing diameters are a non-removable part of the coupler. This ensures that the internal indexing diameters are not removed during servicing.

Accordingly, it is an aspect of this invention to provide an improved valve assembly of simplified construction, lower cost and improved gas flow.

With particular reference to safety, it is an aspect of the present invention to provide a non-removable D.I.S.S. configuration in the outer body, so that during maintenance and repair of the inner body and plunger there is no risk that a non-conforming gas-using device could be connected to a partially disassembled outlet body.

It has now been found that the previous assembly described in the aforementioned patent application can be simplified by the removal of a spring used to bias the plunger into the forward position, in which position the passage through the inner body is closed and the gas is prevented from escaping. This elimination is not simply a matter of removing an element previously part of the total combination, because a realization that this removal is possible leads to a much simplified plunger and inner body construction, and in particular allows the inner body to be much smaller than previously though to be possible. Furthermore, it is possible to carry out this simplification while maintaining or even considerably improving the gas flow rate through the plunger.

GENERAL DESCRIPTION OF THIS INVENTION

Accordingly, this invention provides a valve assembly for dispensing a gas into a connector of a gas using device, which includes an outer body having a forward end and a rearward end and having an internal passageway for gas, the passageway containing a valve seat and valve member which is lifted from the valve seat by rearward pressure. An inner body is threaded into the passageway of the outer body, the inner body having an internal passage and a plunger within the passage, the plunger including a forward hollow sleeve portion and two arm portions extending rearwardly from the sleeve portion at diametrally opposite locations, the arm portions being linked at their rearwards ends by a bridge portion from which rearwardly extends an activating member adapted to hold the valve member away from the valve seat when the plunger is moved to the rear. A sealing member on the plunger forwardly of the activating member is provided for closing the internal passage when the plunger is in a forward position. The inner body defines two opposed, internal, longitudinal grooves for receiving the arm portions, thus interlocking the plunger and the inner body so that rotation of the plunger requires rotation of the inner body. The bridge portion is engageable by a forked tool for rotating the same.

GENERAL DESCRIPTION OF THE DRAWINGS

Two embodiments of this invention are illustrated in the accompanying drawings, in which like numerals denote like parts throughout the several views, and in which.

DETAILED DESCRIPTION OF THE DRAWINGS

Figure 3:
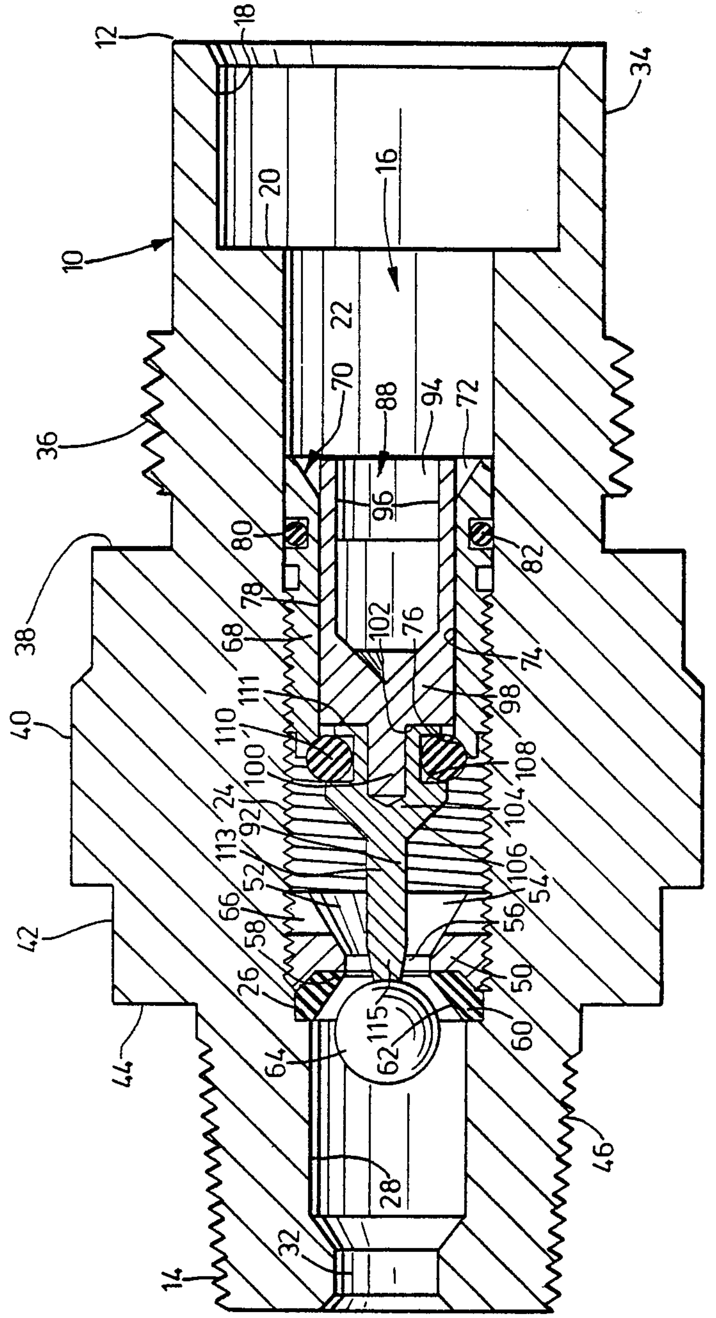
FIG. 3 is an axial sectional view through a valve assembly including an outer body and the components of FIG. 1 in assembled condition.

Attention is first directed to FIG. 3, which shows an outer body 10 adapted for use with a nitrous oxide outlet and having a forward end 12 and a rearward end 14. The outer body 10 has an internal passageway 16 for gas, which undergoes a number of different changes in diameter. At the forward end 12, the passageway 16 has a portion 18 of enlarged diameter which is limited at the rear by a shoulder 20. Rearwardly of the shoulder 20 is a bore 22 which is threaded as shown at 24, and which terminates rearwardly at a shoulder 26. Diameters 18 and 22 are D.I.S.S. gas specific designates. Rearwardly of the shoulder 26 is a portion 28 of smaller diameter, this in turn being limited rearwardly by a restricted portion 32 having frusto-conical flanks. Exteriorly, the outer body has a smooth cylindrical portion 34 at the forward end, a threaded portion 36 rearwardly of the portion 34, a shoulder 38 rearwardly of the threaded portion 36, a hexagonal portion 40 rearwardly of the shoulder 38, a cylindrical portion 42 rearwardly of the hexagonal portion 40, an inward step 44 rearwardly of the cylindrical portion 42, and a tapering pipe thread male connector 46 rearwardly of the step 44.

Threaded into the bore 22 of the outer body 10, engaging with the threads 24, is an annular valve retention member 50 having a cental passageway 52 defined by a frusto-conical portion 54 and a cylindrical throat portion 56. Rearwardly, the member 50 defines a recess 58 for receiving a valve seat member 60, the member 60 having a frusto-conical rearwardly flaring surface 62 against which a valve member, here shown in the form of a ball 64 can seat. In addition, it will be seen in FIG. 3 that the member 60 defining the valve seat is adapted to be compressed between the member 50 and the shoulder 26, thereby providing a seal to prevent gas escaping along the threaded connection between the member 50 and the threads 24 of the bore 22.

At its forward end, the member 50 has a slot 66, for receiving the end of a screwdriver by which the member 50 can be inserted and removed. The sectional plane in FIG. 3 passes through the slot 66.

Figure 1:
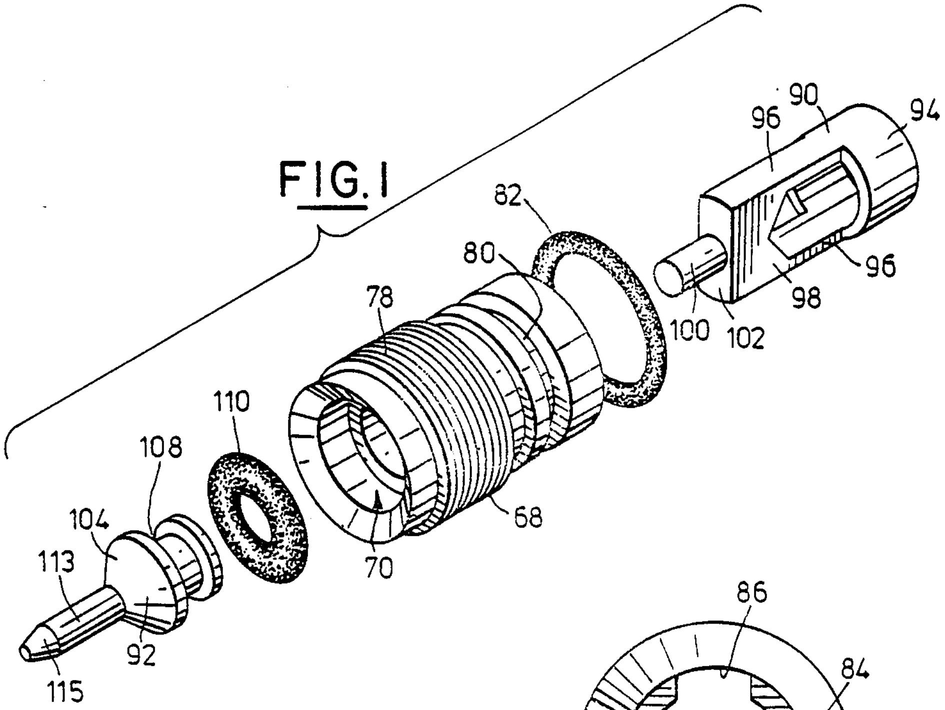
FIG. 1 is an exploded perspective view of the inner body and plunger of one embodiment of this invention.
Figure 2:
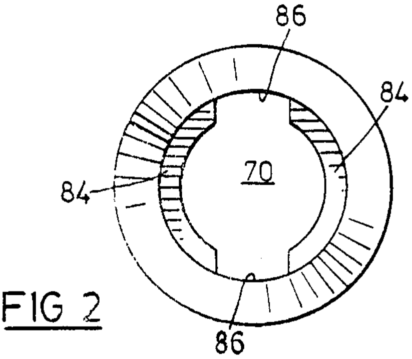
FIG. 2 is an end view of the inner body shown in FIG. 1.
Figure 4:
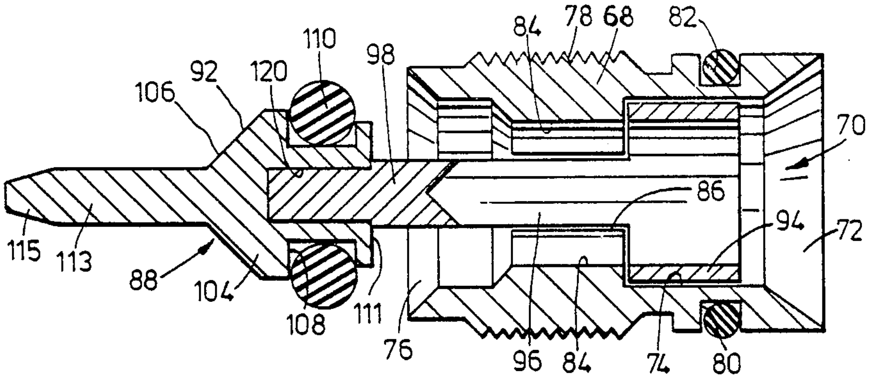
FIG. 4 is a sectional view of the inner body and plunger shown in FIG. 1 the sectional plane being at right angles to the plane used in FIG. 3.

Also threaded into the bore 22 is an inner body 68 seen in section in FIGS. 3 and 4, in perspective in FIG. 1, and in end view in FIG. 2. The inner body 68 has an internal passage 70 defined by a forward frusto-conical portion 72, a central cylindrical portion 74 and a rearward frusto-conical portion 76. Exteriorly, the inner body 68 defines threads 78 for engagement with the threads 24, and an annular recess 80 in which an O-ring seal 82 can be received.

As best seen in FIG. 2, the internal cylindrical portion 74 of the passage 70 is interrupted by two, opposed, C-shaped ridges 84, which can also be seen in the sectional view of FIG. 4. However, because the ridges are separated by longitudinal gaps or grooves 86, the sectional view of FIG. 3 (which is aligned with the gaps 86) does not show the ridges.

The purpose of the ridges 84 and the grooves 86 will become apparent from what follows.

The inner body 68 is adapted to receive a plunger 88 which consists of two parts which are made separately and then are locked together. In FIG. 1, a forward part 90 is shown to the right of the inner body 68, and a rear part 92 to the left. The front part 90 has a forward hollow sleeve portion 94 integrally formed with two arm portions 96 extending rearwardly (leftwardly in the diagrams (from the sleeve portion 94 at diametrally opposite locations with respect to the sleeve portion 94. The arm portions are linked at their rearward (leftward) ends by a bridge portion 98, from which rearwardly extends an integral projecting post 100. The bridge portion 98 has a flat rearward face 102 perpendicular to the axis of the cylindrical sleeve portion 94.

The rear part 92 of the plunger 88 includes a boss 104 having a frusto-conical rear surface 106, an annular groove 108 for receiving an O-ring seal 110, a flat rear face 111, and a rearwardly projecting elongated activating member 113, having a tapering nose 115.

As can be seen particularly in FIG. 4, the maximum diameter of the boss 104 is greater than the inside diameter of the C-shaped ridges 84, thus preventing the rear part 92 of the plunger from passing through the passage 70 in the inner body 68. Likewise visible in FIG. 4 is the fact that the maximum diameter of the sleeve portion 94 of the front part 90 of the plunger is greater than the inside diameter of the ridges 84, thus preventing the front part 90 from passing leftwardly through the passage 70

It will now be evident why the plunger must be manufactured in two parts. As seen in FIG. 4, the front part 90 and the rear part 92 are assembled to each other with the post 100 being received in a bore 120 axially of the boss 104. The fit is very tight, and a suitable locking compound is applied to ensure that, once assembled, the front part 90 of the rear part 92 cannot come apart.

Figure 6:
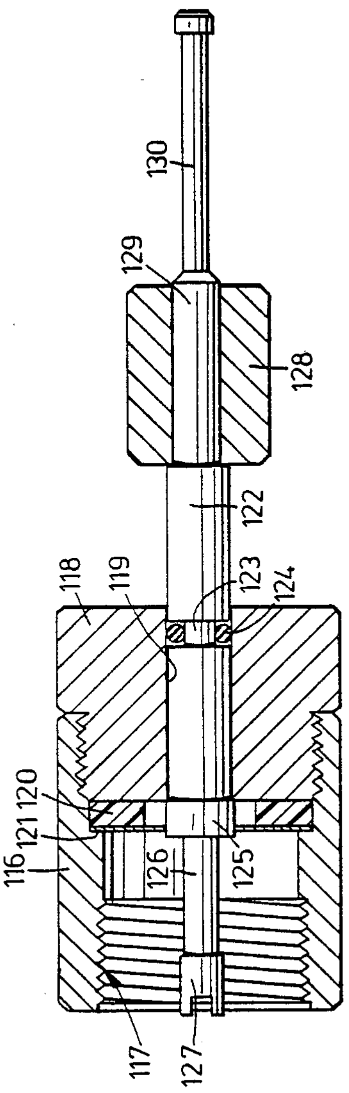
FIGS. 6 and 7 are axial sectional views of two tools for use with the invention.
Figure 7:
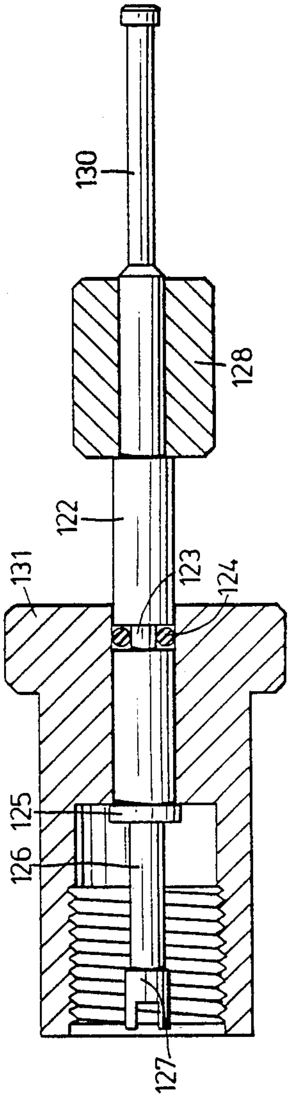

In order to insert the front page 90 through the passage 70, the arm portions 96 must be aligned with the grooves 86. This alignment is maintained after assembly of the plunger, and is such that both the inner body 68 and the plunger 88 must rotate together. Thus, in order to rotate the inner body 68 with respect to the outer body 10, it is necessary simply to grip the plunger 88 and rotate it. Two instruments for accomplishing this are shown in FIGS. 6 and 7. Referring to FIG. 6, which is an instrument suitable for use with connections for $N_2$, $N_2O$, medical air and vacuum, a sleeve 116 has an internal thread 117 for engagement with the threaded portion 36 (FIG. 3), and threadedly engages a boss 118 having a internal bore 119. Between the boss 118 and the sleeve 116 are captured a resilient washer 120 and a disc 121. Through the bore 119 passes a shaft 122 which has a reduced portion 123 where an O-ring 124 is located. An enlarged portion 123 prevents the shaft 122 from moving further to the right than the position shown in FIG. 6. Leftwardly from the enlarged portion 125 extends a reduced neck 126 having a forked end 127 which is adapted to engage the bridge portion 98 extending between the two arm portions 96 of the front part 90 (see FIG. 3). Thus engaged, the plunger can be rotated by rotating the shaft 122. Such rotation is facilitated by the presence of a knob 128 which is securely mounted on a reduced portion 129 coaxial with the shaft 122. A further extension 130 projects rightwardly from the knob 128.

FIG. 7 shows a similar tool, which differs primarily in that the sleeve 116 and boss 118 of the FIG. 6 tool are replaced by an integral nut 131 having an internal thread adapted to engage the outer threads of an oxygen connector. Apart from this difference, the tool of FIG. 7 lacks the resilient washer 120 and the disc 121. However, the function of the two tools is the same.

Figure 5:
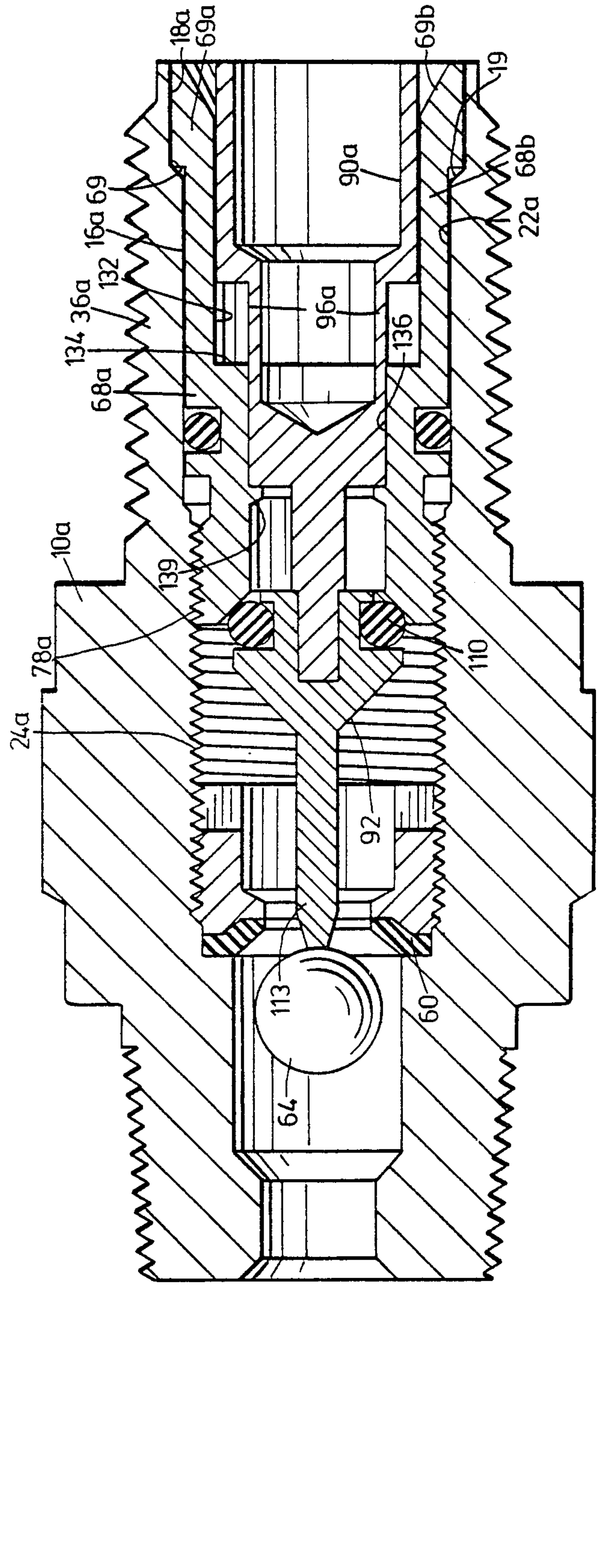
FIG. 5 is a sectional view through a valve assembly in accordance with a second embodiment of this invention.

A second embodiment of this invention is illustrated in FIG. 5, which is similar in many respects to the embodiment shown in FIG. 3. The similar portions are not numbered or described in what follows, in order to avoid needless duplication.

The embodiment of FIG. 5 is particularly suitable as an oxygen valve, and includes an outer body **10*a* differing from the outer body 10 primarily in the length of the threads 36*a*. The outer body 10*a* has a passageway 16*a* which has an enlarged portion 18*a* at the rightward (forward) end, a frusto-conical shoulder 19, and a cylindrical bore 22*a* of larger diameter than the cylindrical bore 22 in FIG. 3**.

In the care of the FIG. 5 embodiment, the inner body **68*a* has a forwardly extending cylindrical portion 68*b*, which widens at the location 69 to define a forward portion 69*a* which is too large in diameter to enter the bore 22*a*. The portion 69*a* has a frusto-conical lead-in 69*b***.

The inner body **68*a* has an enlarged bore 132 terminating at a rearward shoulder 134, rearwardly joining a bore 136 of smaller diameter in which two ridges (not visible in the section utilized for FIG. 5) are located. These ridges again define diametrally opposite grooves in which arm portions 96*a* of a front part 90*a* of the internal plunger register. In this embodiment, an annular rib 139 prevents further leftward movement of the plunger, beyond the position shown in FIG. 5**.

The rear part 92 in FIG. 5 is the same as the part 92 in FIG. 3.

It will be noted in FIG. 5 that the inner body **68*a* has threads 78*a* for engaging the internal threads 24*a* of the outer body 10*a*. It will also be noted that the forward portions of the inner body 68*a* are of too great a diameter to pass into the region having the internal threads 24*a***.

In the embodiments of both FIG. 3 and FIG. 5, it will be noted that, with the plunger pulled fully forwardly (the furthest right position in the drawings), the elongated activating member 113 is in a position to dislodged the valve member 64, and prevent it from seating against the valve seat member 60. It will thus be appreciated that the ball 64 normally never seats against the member 60, but simply lies against the bottom of the chamber which contains it. When the plunger is in its furthest rightward position, thus closing the passageway against all movement of gas, there is no gas pressure attempting to move the ball 64. When the plunger moves leftwardly to allow gas to escape through the inner body, there will be a rush of gas rightwardly past the ball 64 which will carry it in the direction of the valve seat member 60. However, the position of the activating member 113 will prevent such seating from taking place, and therefore no interference with gas flow will occur.

Thus, one can look at the annular O-ring 110 as a primary seal, and the ball 64 as a secondary seal, which comes into effect only upon removal of the inner body from the outer body. This permits servicing of the inner body and the plunger, without any leakage of gas through the outer body.

It will further be appreciated that, particularly in the embodiment of FIGS. 3 and 4, a substantial simplification has been effected. No allowance needs to be made for a spring member to urge the plunger into the forward position, since the pressure of gas will normally accomplish this. Furthermore, the opening through the front part 90 of the plunger is of substantial dimension, thus interfering to the least extent with gas flow. Finally, the construction described above is one which does not require the complex machining necessary to provide a hexagonal fit between the plunger and the inner body. This simplication reduces the cost of machining.

While two embodiments of this invention have been illustrated in the accompanying drawings and described hereinabove, it will be evident to those skilled in the art that changes and modifications may be made therein without departing from the essence of this invention, as set forth in the appended claims.

We claim:

1. A valve assembly for dispersing a gas into a connector of a gas using device, comprising: an outer body having a forward end and a rearward end and having an internal passageway for gas, the passageway containing a valve seat and a valve member which is lifted from said valve seat by rearward pressure, and an inner body having an internal passage and a plunger within said passage, the plunger including a forward hollow sleeve portion and two arm portions extending rearwardly from the sleeve portion at diametrically opposite locations, the arm portion being linked at their rearward ends by a bridge portion from which rearwardly extends an activating member adapted to hold the valve member away from the valve seat, said bridge portion having substantially parallel sides and an integral rearwardly projecting post, said post being recessed tightly in a bore of a boss which is integral with said activating member, a sealing member on the plunger forwardly of the activating member for closing said internal passage when the plunger is in a forward position, the inner body defining two opposed, internal, longitudinal grooves for receiving said arm portions thus interlocking the plunger and the inner body so that rotation of the plunger requires rotation of the inner body, the bridge portion being engagable by a forked tool for rotating the same, both said sleeve portion and said boss being too large to pass the location of the inner body which has the internal longitudinal grooves.

2. The valve assembly claimed in claim 1, in which the sealing member is an O-ring mounted on said boss.

3. The valve assembly claimed in claim 2, in which the inner body has a sealing means for sealing against the internal passageway of the outer body.

4. The valve assembly claimed in claim 3, in which the internal passageway of the outer body is stepped at the forward end for mating with a complementary connector for a gas using device.

5. The valve assembly claimed in claim 1, in which the valve member is a ball, and in which the valve seat is an annular resilient seat retained in place by a collar threaded internally into said internal passageway of the outer body.

6. The valve assembly claimed in claim 1, in which the outer body has tapering pipe thread male connection at the rearward end.

* * * * *